US008929810B2

(12) United States Patent
Frankland et al.

(10) Patent No.: US 8,929,810 B2
(45) Date of Patent: Jan. 6, 2015

(54) METHODS AND APPARATUS FOR IMPROVING NFC CONNECTION THROUGH DEVICE POSITIONING

(75) Inventors: Stephen Frankland, Horsham (GB); John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 13/453,083

(22) Filed: Apr. 23, 2012

(65) Prior Publication Data

US 2013/0281014 A1    Oct. 24, 2013

(51) Int. Cl.
*H04B 5/00*      (2006.01)

(52) U.S. Cl.
USPC ........................................................ 455/41.1

(58) Field of Classification Search
CPC ................................. H04B 5/00; H04W 4/008
See application file for complete search history.

(56) References Cited

U.S. PATENT DOCUMENTS

| | | | |
|---|---|---|---|
| 6,201,387 B1 | 3/2001 | Govari | |
| 6,407,665 B2 | 6/2002 | Maloney | |
| 6,906,667 B1 | 6/2005 | Poilasne et al. | |
| 7,769,345 B2 | 8/2010 | Johnson et al. | |
| 2004/0088012 A1 | 5/2004 | Kroll et al. | |
| 2005/0017677 A1 | 1/2005 | Burton et al. | |
| 2005/0231433 A1 | 10/2005 | Nantz et al. | |
| 2006/0061325 A1 | 3/2006 | Tang et al. | |
| 2006/0132352 A1 | 6/2006 | Schantz et al. | |
| 2006/0158152 A1 | 7/2006 | Taniguchi et al. | |
| 2006/0160487 A1 | 7/2006 | Nam et al. | |
| 2007/0004456 A1 | 1/2007 | Shimada | |
| 2007/0008140 A1 | 1/2007 | Saarisalo et al. | |
| 2007/0024509 A1 | 2/2007 | Lee | |
| 2007/0126650 A1 | 6/2007 | Guenther | |
| 2007/0176833 A1 | 8/2007 | Haho et al. | |
| 2008/0164978 A1 | 7/2008 | Tanada | |
| 2008/0245851 A1 | 10/2008 | Kowalski | |
| 2008/0252416 A1 | 10/2008 | Posch et al. | |

(Continued)

FOREIGN PATENT DOCUMENTS

| | | |
|---|---|---|
| EP | 2337323 A1 | 6/2011 |
| JP | H11122146 A | 4/1999 |

(Continued)

OTHER PUBLICATIONS

International Search Report and Written Opinion—PCT/US2013/037223—ISA/EPO—Jul. 1, 2013.

*Primary Examiner* — Andrew Wendell
*Assistant Examiner* — Maryam Soltanzadeh
(74) *Attorney, Agent, or Firm* — Charles E. Eggers

(57) ABSTRACT

Aspects disclosed herein relate to improving near field communication (NFC) device positioning for performing a NFC action based on one or more sensory cues. In one example, a NFC device may be equipped to detect that a device is attempting to perform a NFC action to communicate with a remote NFC device and may provide a first sensory cue to indicate a first location on a first surface of the device corresponding to an antenna location on a second surface of the device in response to the determination that the device is attempting to perform the NFC action. The NFC device may be further operable to determine a type of NFC action the device is attempting to perform and provide a second sensory cue indicating a second location on the first surface of the device based on one or more factors associated with the determined type of NFC action.

36 Claims, 9 Drawing Sheets

(56) References Cited

U.S. PATENT DOCUMENTS

| | | |
|---|---|---|
| 2008/0272889 A1 | 11/2008 | Symons |
| 2008/0311957 A1* | 12/2008 | Jantunen et al. ............... 455/560 |
| 2009/0001930 A1 | 1/2009 | Pohjonen |
| 2009/0239591 A1* | 9/2009 | Alameh et al. ................ 455/574 |
| 2010/0093277 A1 | 4/2010 | Bloebaum et al. |
| 2010/0190537 A1 | 7/2010 | Fujii |
| 2011/0065383 A1 | 3/2011 | Frankland et al. |
| 2011/0070825 A1* | 3/2011 | Griffin et al. ................ 455/41.1 |
| 2011/0070828 A1 | 3/2011 | Griffin et al. |
| 2011/0070834 A1 | 3/2011 | Griffin et al. |
| 2013/0109310 A1* | 5/2013 | Mine et al. ................... 455/41.1 |
| 2014/0128032 A1* | 5/2014 | Muthukumar ................ 455/411 |

FOREIGN PATENT DOCUMENTS

| | | |
|---|---|---|
| JP | 2002123619 A | 4/2002 |
| JP | 2002209343 A | 7/2002 |
| JP | 2006004015 A | 1/2006 |
| JP | 2006201959 A | 8/2006 |
| JP | 2008206297 A | 9/2008 |
| JP | 5013111 B2 | 8/2012 |
| WO | 2006096685 A1 | 9/2006 |
| WO | 2008039559 A1 | 4/2008 |

* cited by examiner

METHODS AND APPARATUS FOR IMPROVING NFC CONNECTION THROUGH DEVICE POSITIONING

BACKGROUND

1. Field

The disclosed aspects relate generally to communications between and/or within devices and specifically to methods and systems for improving near field communication (NFC) connections through device positioning based on one or more sensory cues.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, near field communication (NFC), etc.

One feature of NFC is that a successful connection only be established within a comparatively small operating volume. In other words, an NFC enabled device and a remote NFC device need to be within close proximity of each other in order to successfully perform an NFC action. As used herein, an NFC action may include, but is not limited to, radio frequency (RF) discovery, NFC link establishment, data exchange, etc. Because of the comparatively small operating volume, a challenge arises in determining how to effectively indicate to a user where an optimal place is on a NFC device for performing an NFC action. Generally, to assure a robust connection, a user may align the antenna location of an NFC device with the remote NFC device. Where this location is indicated by a mark on the underside of the NFC device, the location is not be visible to the user when the NFC device is held in close proximity to the remote NFC device (e.g., a reader/writer, tag, peer device, etc.). Further, a NFC device may have a user interface substantially covering the front surface, so it is not possible to place a mark to indicate a location on the top surface. Also, even if a mark could be placed on the front surface of a device, for manufacturers, the need to choose a location for such a mark on the external casing would mean that different casings would be needed for different antenna sizes and/or locations. This would add cost, and/or limit the ability to optimize antenna design for a given NFC device configuration.

Thus, improved apparatus and methods for improving NFC device positioning for performing a NFC action based on one or more sensory cues may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving NFC device positioning for performing a NFC action based on one or more sensory cues. In one example, a NFC device may be equipped to detect that a device is attempting to perform a NFC action to communicate with a remote NFC device and may provide a first sensory cue to indicate a first location on a first surface of the device corresponding to an antenna location on a second surface of the device in response to the determination that the device is attempting to perform the NFC action. The NFC device may be further operable to determine a type of NFC action the device is attempting to perform and provide a second sensory cue indicating a second location on the first surface of the device based on one or more factors associated with the determined type of NFC action.

According to related aspects, a method for providing improved NFC device positioning for performing a NFC action based on one or more sensory cues is provided. The method can include detecting that a device is attempting to perform a NFC action to communicate with a remote NFC device. Further, the method may include providing a first sensory cue to indicate a first location on a first surface of the device corresponding to an antenna location on a second surface of the device in response to the determination that the device is attempting to perform the NFC action. Further, the method may include determining a type of NFC action the device is attempting to perform. Moreover, the method can include providing a second sensory cue indicating a second location on the first surface of the device based on one or more factors associated with the determined type of NFC action.

Another aspect relates to a communications apparatus. The wireless communications apparatus can include means for detecting that a device is attempting to perform a NFC action to communicate with a remote NFC device. Further, the communications apparatus can include means for providing a first sensory cue to indicate a first location on a first surface of the device corresponding to an antenna location on a second surface of the device in response to the determination that the device is attempting to perform the NFC action. Further, the communications apparatus can include means for determining a type of NFC action the device is attempting to perform. Moreover, the communications apparatus can include means for providing a second sensory cue indicating a second location on the first surface of the device based on one or more factors associated with the determined type of NFC action.

Another aspect relates to an apparatus for NFC communications. The apparatus can include a user interface, a memory, and a processor coupled to the memory. The apparatus may further include a NFC action position optimization module coupled to at least one of the user interface or the processor and configured to detect that a device is attempting to perform a NFC action to communicate with a remote NFC device. Further, the NFC action position optimization module along with the user interface may be configured to provide a first sensory cue to indicate a first location on a first surface of the device corresponding to an antenna location on a second surface of the device in response to the determination that the device is attempting to perform the NFC action. Further, the NFC action position optimization module may be configured to determine a type of NFC action the device is attempting to perform. Moreover, the NFC action position optimization module along with the user interface may be configured to provide a second sensory cue indicating a second location on the first surface of the device based on one or more factors associated with the determined type of NFC action.

Another aspect relates to a computer program product, which can have a computer-readable medium comprising code for detecting that a device is attempting to perform a NFC action to communicate with a remote NFC device. Further, the computer-readable medium can include code for providing a first sensory cue to indicate a first location on a first surface of the device corresponding to an antenna location on a second surface of the device in response to the determination that the device is attempting to perform the NFC action. Further, the computer-readable medium can include code for determining a type of NFC action the device is attempting to perform. Moreover, the computer-readable medium can include code for providing a second sensory cue indicating a second location on the first surface of the device based on one or more factors associated with the determined type of NFC action.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, as part of an NFC action a device may recognize a NFC target device and/or tag when within range of the coverage area of the NFC device and/or tag. Thereafter, the device may obtain sufficient information to determine a type of NFC action to allow for communications to be established. One example of types of NFC actions includes different types of RF technologies. Communications between the devices may be enabled over a variety of NFC RF technologies, such as but not limited to, NFC-A, NFC-B, NFC-F, etc. Further, an NFC action may include aspects associated with different phases of communications (e.g., an activation phase, a data exchange phase, etc.) Still further, different RF technologies and different types of NFC actions may be associated with different locations that allow for optimal communications.

Figure 1:
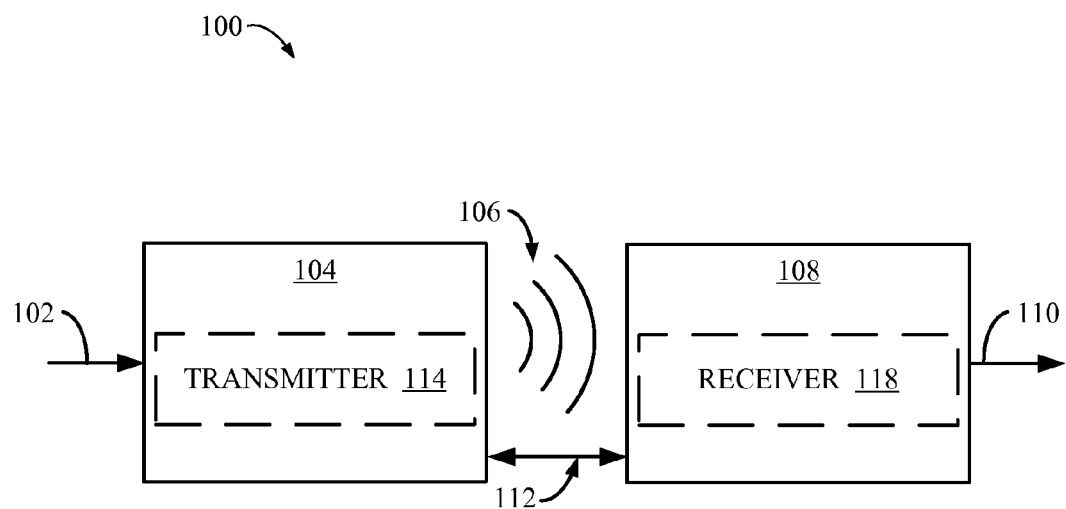
FIG. 1 illustrates a simplified block diagram of a near field wireless communication system according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
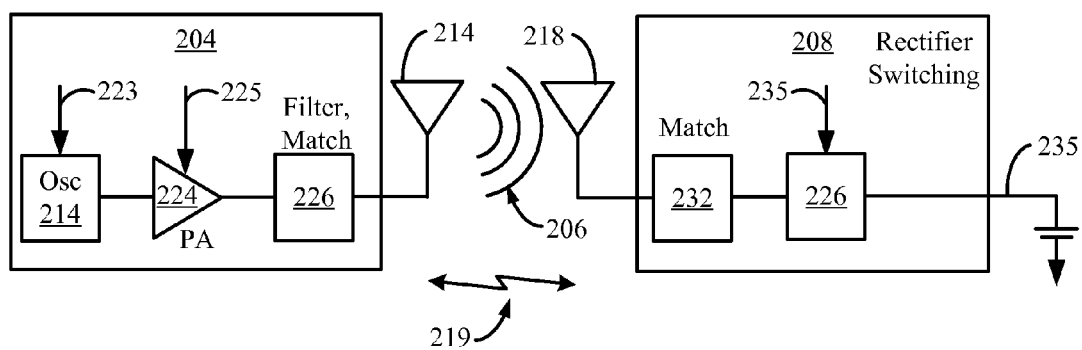
FIG. 2 illustrates a simplified schematic diagram of a near field communication transfer system according to an aspect.

FIG. 2 shows a simplified schematic diagram of a near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

Figure 3:
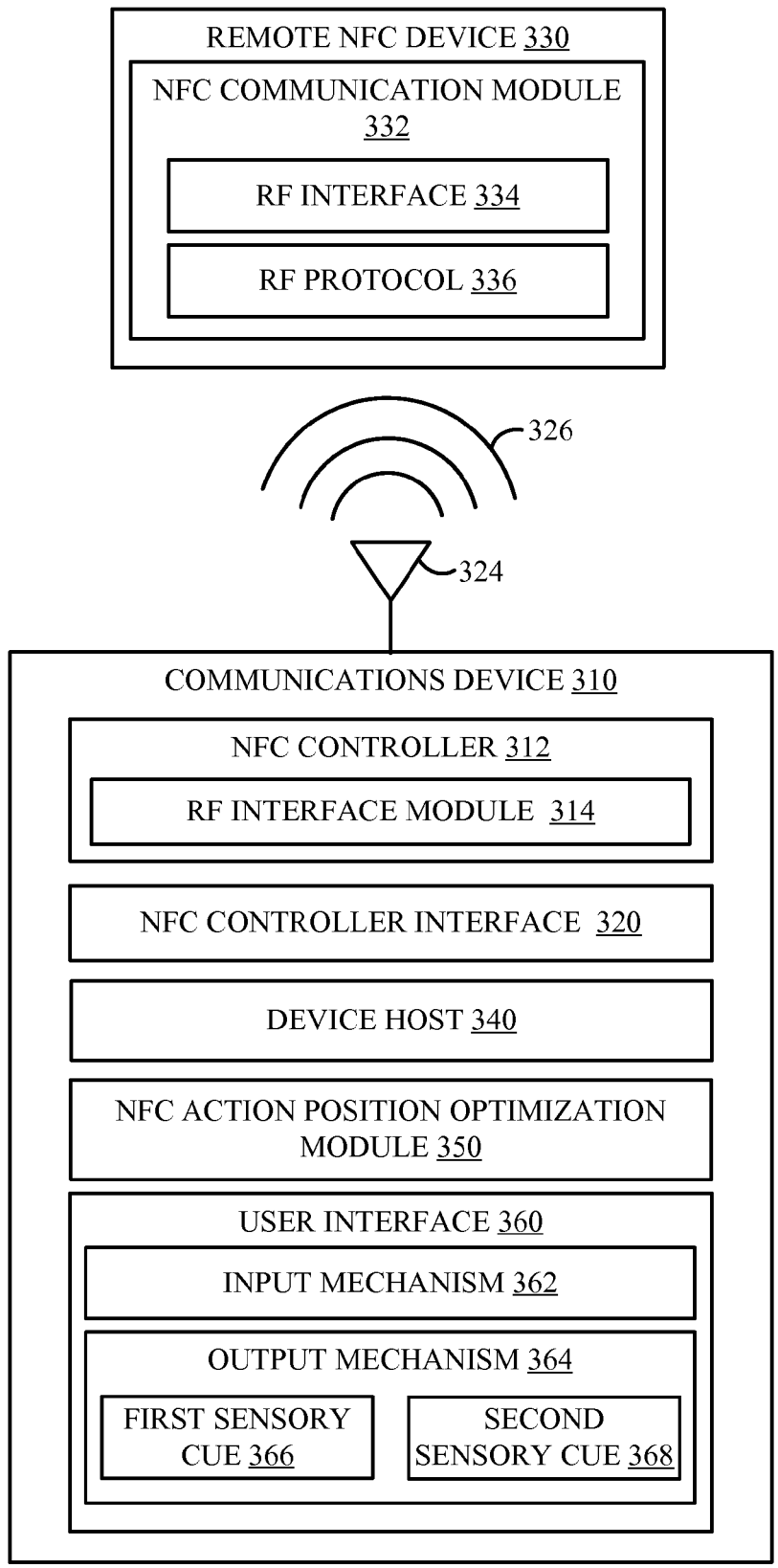
FIG. 3 illustrates a block diagram of a NFC environment according to an aspect.

With reference to FIG. 3, a block diagram of a communication network 300 according to an aspect is illustrated. Communication network 300 may include communications devices 310 which, through antenna 324, may be in communication with a remote NFC device 330 using one or more NFC technologies 326 (e.g., NFC-A, NFC-B, NFC-F, etc.). In one aspect, remote NFC device 330 and/or communication device 310 may be operable to communicate through NFC communication module 332 through one or more RF interfaces 334 using one or more RF protocols 336. In another aspect, communications device 310 may be operable to be connected to an access network and/or core network (e.g., a CDMA network, a GPRS network, a UMTS network, and other types of wireline and wireless communication networks). In one aspect, remote NFC device 330 may include but is not limited to a remote NFC tag, a reader/writer device, a peer initiator device, a remote peer target device, etc.

Communication device 310 may include NFC controller interface (NCI) 320. In one aspect, NCI 320 may be operable to enable communications between a NFC enabled antenna 324 and NFC controller 312.

Communications device 310 may further include a NFC controller (NFCC) 312, device host (DH) 340, and user interface 360. In one aspect, NFCC 312 may include RF interface module 314. RF interface module 314 may be operable to perform RF discovery using a RF discovery loop as part of a NFC discovery process. DH 340 may be operable to generate a command to prompt NFCC 312 to perform various NFC actions, such as but not limited to, RF discovery, NFC data exchange, etc. User interface 360 may include an input mechanism 362 and an output mechanism 364.

Communications device 310 may include NFC action position optimization module 350. NFC action position optimization module 350 may be operable to prompt to user interface 360 to provide one or more first sensory cues 366 based at least in part on a determination that a NFC action is being attempted by communications device 310. As used herein, a NFC action may include, but is not limited to, RF discovery, NFC link establishment, data exchange, etc. Further, NFC action position optimization module 350 may be operable to prompt to user interface 360 to provide one or more second sensory cues 368 based at least in part on a determination of a type of NFC action that is attempting to be performed by communications device 310. As used herein, a type of NFC action may include, but is not limited to, a type of RF technology used for an NFC action, a type of remote NFC device with which the communications device 310 is attempting to communicate, a data rate to be used during the NFC action, etc.

In one operational aspect, when NFC action position optimization module 350 detects that communications device 310 is attempting to perform a NFC action, NFC action position optimization module 350 may prompt user interface 360 to provide a first sensory cue 366 to assist in indicating a location of the NFC antenna 324 on the communications device 310. In one aspect, a sensory cue may include at least one of a graphical representation, an auditory indication, a vibration indication, etc. Continuing the above described operational aspect, when NFC action position optimization module 350 determines a type of NFC action that communications device 310 is attempting to perform, then NFC action position optimization module 350 may prompt user interface 360 to provide a second sensory cue 368 to assist in indicating a location that is an optimal location positioning the communications device 310 with respect to the remote NFC device 330 to perform to determined type of NFC action. Thereafter, communications device 310 and remote NFC device 330 may perform the NFC action.

Therefore, a system and method is disclosed to provide improved NFC antenna 324 align for performing a NFC action through use of one or more sensory cues (366, 368).

Figure 4:
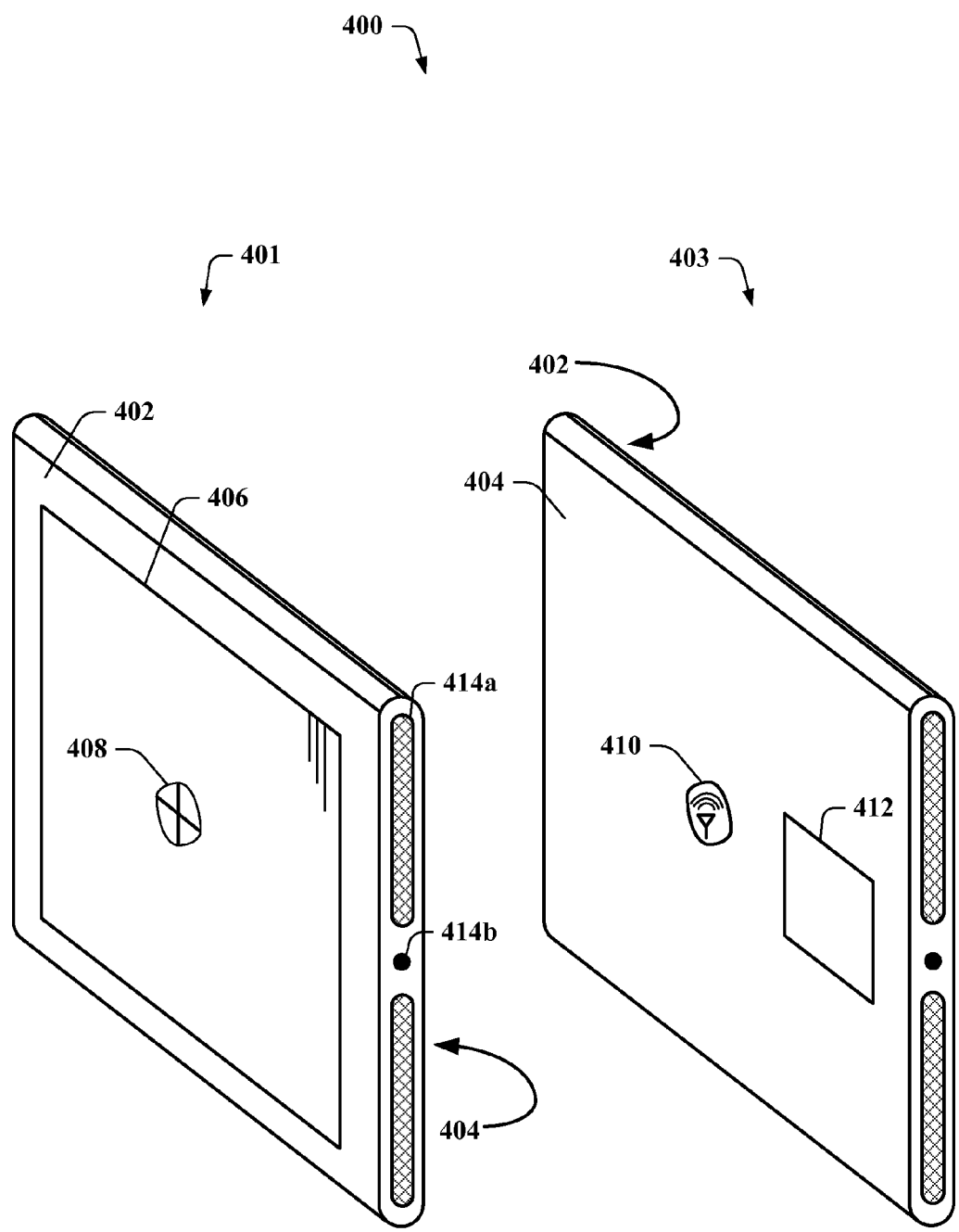
FIG. 4 illustrates multiple views of an example communications device with a first side and a second side, according to an aspect.

FIG. 4 illustrates multiple views (401, 403) of an example communications device 400 with a first side 402 and a second side 404. A first view 401 of communications device 400 illustrates a first surface 402 with a user interface display 406 on the first surface 402. A second view 403 of communications device 400 illustrates a second surface 404 with a location of an NFC antenna 410. Although FIG. 4 depicts a single NFC antenna 410, one of ordinary skill in the art would understand that the description may be applied to a plurality of NFC antennas 410. In one aspect, alignment of the NFC antenna 410 with a remote NFC device (e.g., 303) allows the communications device 400 to perform a NFC action. As depicted in FIG. 4, a first surface 402 is substantially parallel to the second surface 404 and the first surface 402 and second surface 404 are on opposite sides of the communication device 400. As such, during operation the second surface 404 is not visually accessible to a user interacting with the user interface 406 on the first surface 402 when the communications device 400 is positioned to perform a NFC action.

In one aspect, the communications device 400 may detect that a user is attempting to perform a NFC action. In such an aspect, the communications device 400 may detect the attempt through at least one of detecting activation of the communications device 400, detecting initiation of an application, detecting a change in orientation of the communications device 400, a user input, etc. Upon detection of the attempted NFC action, the communications device 400 may provide one or more sensory cues to assist a user in aligning the NFC antenna 410 with a remote NFC device (e.g., a reader/writer, tag, peer device, etc.).

In one aspect, the sensory cue may include a graphical representation 408 on the user interface 406 of the communications device 400 on the first surface 402. In such an aspect, the graphical representation 408 may include a target shape, arrow directions, text indicating a location, text indicating one or more directions for a user to follow, etc.

In one aspect, the sensory cue may include a variable vibration indication enabled by a vibration module 412. In such an aspect, the vibration module 412 may vary frequency, intensity, etc., of a vibration based on a proximity to an alignment location for the NFC antenna 410. In other words, vibration module 412 may enable increased vibration frequency and/or vibration intensity as the communications device 400 is moved into closer proximity to an alignment location.

In one aspect, the sensory cue may include a variable auditory indication enabled by one or more auditory modules, such as but not limited to, speakers 414a, an audio interface 414b, etc. In such an aspect, the auditory module (414a, 414b) may vary a frequency of an audio signal, a voice message, a volume based on a proximity to an alignment location for the NFC antenna 410. For example, auditory module (414a, 414b) may provide a "pinging" noise that changes in frequency and/or volume as the communications device 400 is moved into closer proximity to an alignment location. In another example, auditory module (414a, 414b) may provide verbal instructions (e.g., "move left," "move up," etc.) to assist a user in guiding the communications device 400 into closer proximity to an alignment location.

In one aspect, the various sensory cues may be used in combination with each other. For example, the user interface 406 may display a target 408 as an auditory module 414a provides spoke instructions to assist a user in guiding the communications device 400 into closer proximity to an alignment location.

In one aspect, direct alignment of the NFC antenna 410 with an antenna associated with the remote NFC device may not provide an optimal alignment for performing different types of NFC action. One or more factors may affect NFC antenna alignment, such as but not limited to, comparative sizes of the antenna associated with the remote NFC device and the NFC antenna 410, a coupling value indicating a strength of magnetic coupling of an antenna associated with the remote NFC device and the NFC antenna 410. As such, once communications device 400 determines a type of NFC action that the user is attempting to perform then a second one or more sensory cue may be provided to assist the user to align the communications device 400 with the remote NFC device (e.g., 330) to facilitate the determined type of NFC action. Further discussion of the alignment process is provided with reference to FIG. 5.

Figure 5:
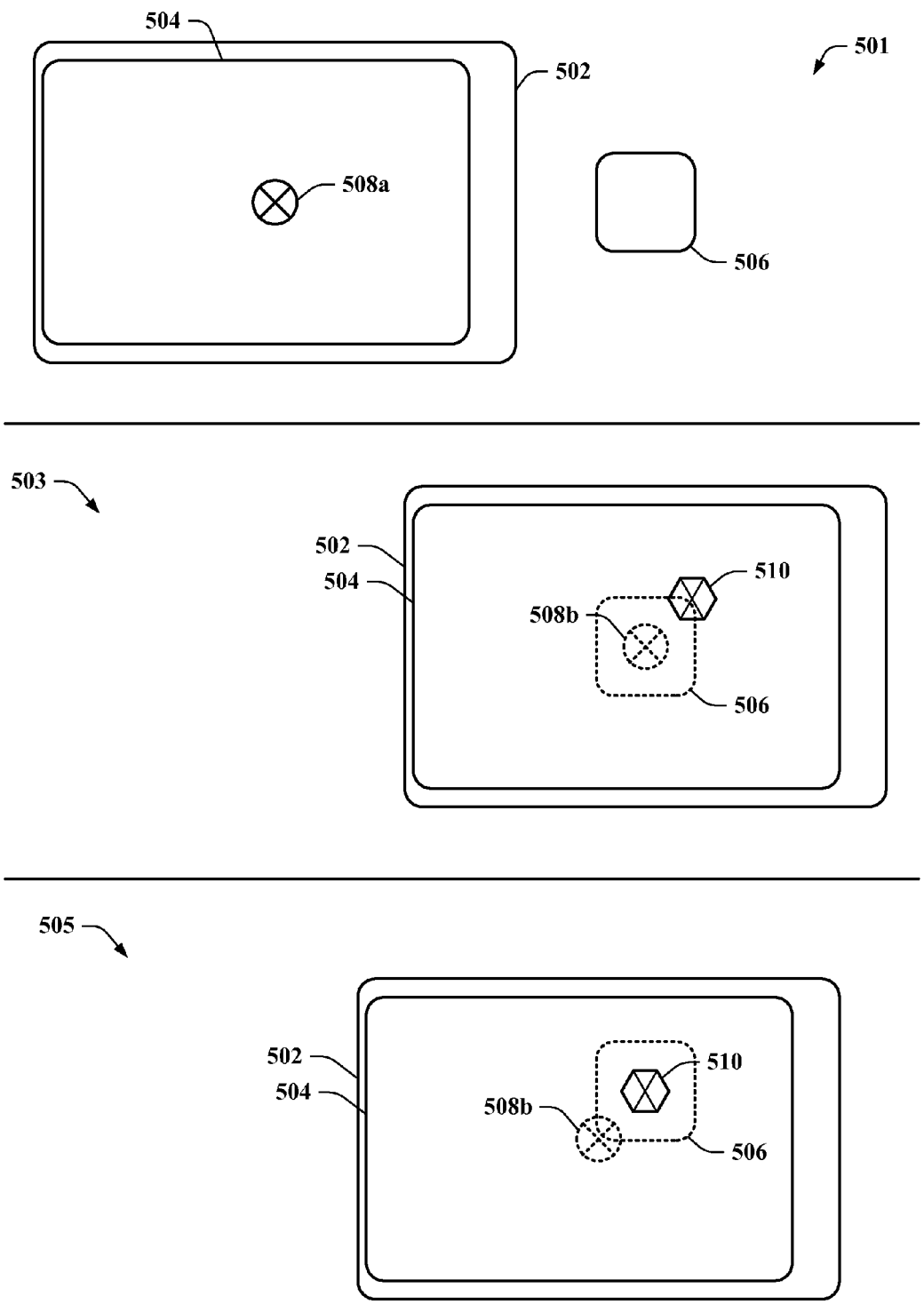
FIG. 5 illustrates a block diagram of a communications device at a plurality of times during performance of an NFC action, according to an aspect.

FIG. 5 illustrates an example communications device 502 at a plurality of times (501, 503, 505) during performance of an NFC action. Communications device 502 may include a user interface 504 that occurrences a substantial portion of a front surface (e.g., first surface).

At time interval 501, communications device 502 may detect that the user is attempting to perform a NFC action with a remote NFC device 506. In response to the detection, communications device 502 may provide a first sensory cue 508a. In one aspect, the first sensory cue 508a may include at least one of a graphical representation, an auditory indication, a vibration indication, etc. Further, the first sensory cue 508a may provide a representation of the location of a NFC antenna located on the backside (e.g., second surface) of communications device 502. In the depicted aspect, the first sensory cue 508a includes a target shape displayed on the user interface 504.

At time interval 503, once communications device 502 is within proximity of the remote NFC device 506 based on the first sensory cue 508b, the communications device 502 may determine a type of NFC action that the user is attempting to perform. As different types of NFC actions may be enabled through different alignments between one or more NFC antennas associated with the communications device 502 and the remote NFC device 506, a second sensory cue 510 may be provided. In aspect, once the second sensory cue 510 is provide, the first sensory cue may be modified 508b. In such an aspect, modification may include removal, discontinuation, fading, changing to be partially transparent, etc. of the first sensory cue 508b. One or more factors may be used to determine the location of the second sensory cue 510, such as but not limited to, comparative sizes of the antenna associated with the remote NFC device 506 and the NFC antenna located under the first sensory cue 508a, a coupling value indicating a strength of magnetic coupling of an antenna associated with the remote NFC device 506 and the NFC antenna located under the first sensory cue 508a.

At time interval 505, the communications device 502 may be aligned with the second sensory cue 510, and the NFC action may be performed.

Figure 6:
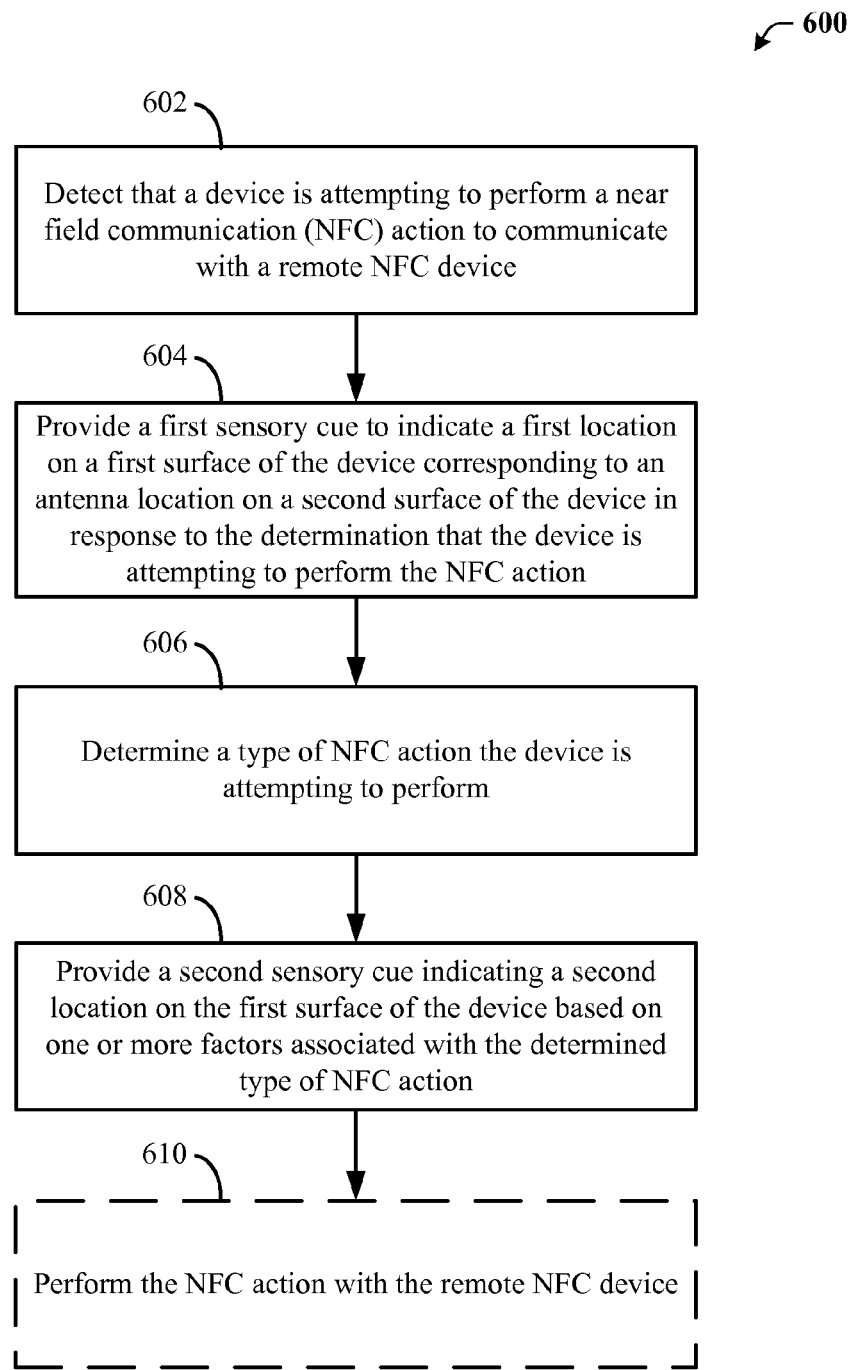
FIG. 6 illustrates a flowchart describing an example system for improving NFC device positioning for performing a NFC action based on one or more sensory cues according to an aspect.
Figure 7:
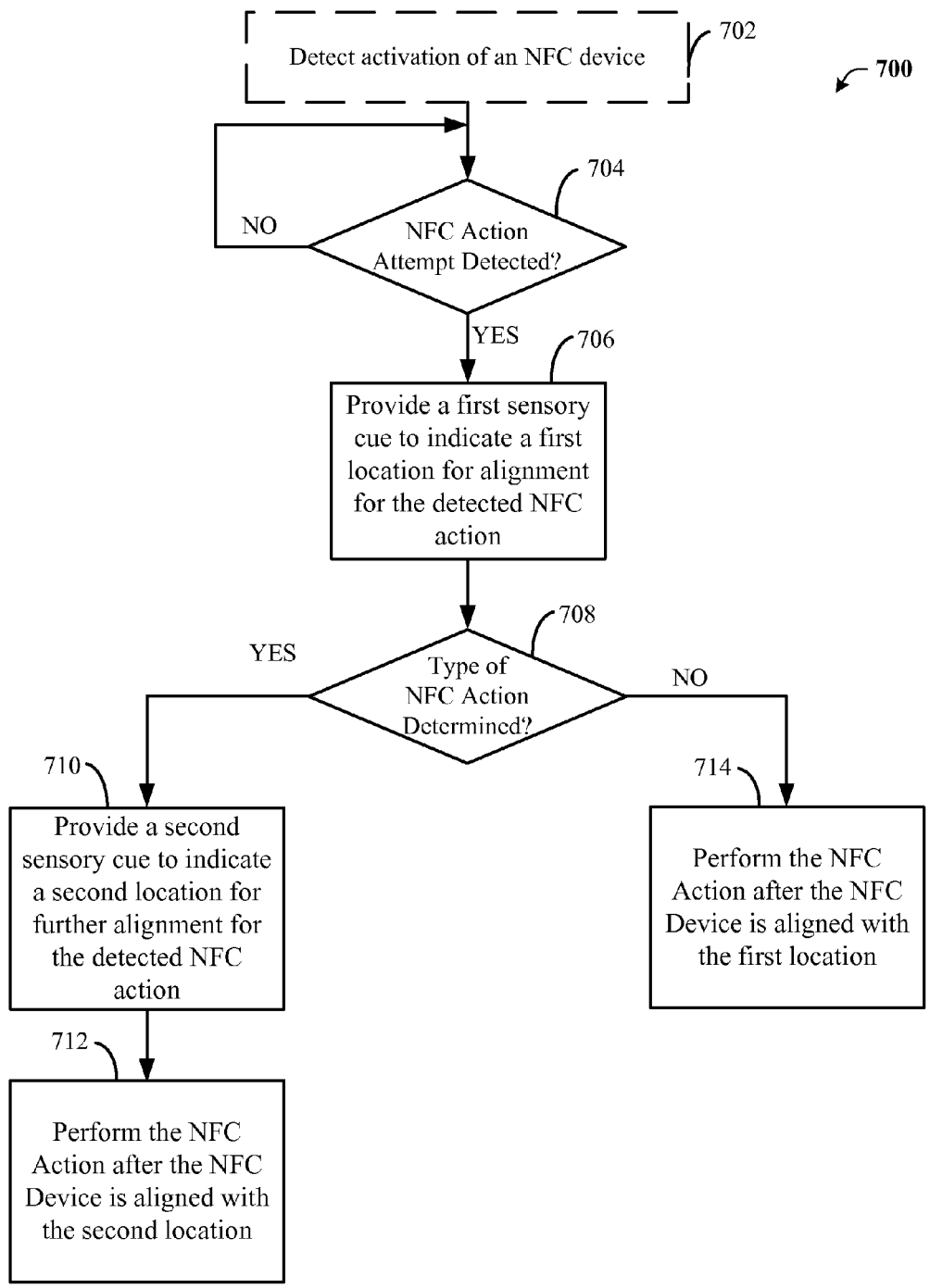
FIG. 7 illustrates a flowchart describing another example system for improving NFC device positioning for performing a NFC action based on one or more sensory cues according to an aspect.

FIGS. 6-7 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 depicts an example flowchart describing a process 600 for efficiently indicating to a user one or more positions to use for performing an NFC action.

At block 602, a device may detect an attempt to perform a NFC action to communicate with a remote NFC device. In one aspect, the device may detect that a NFC action may be performed within a threshold period of time. In one aspect, this detection may result from at least one of activating the device, activating an application associated with NFC, a change in orientation of the device, etc. In another aspect, the device may detect that a remote NFC device is within a threshold distance and may notify the user of its potential presence.

At block 604, the device may provide a first sensory cue to indicate a first location on a first surface of the device corresponding to an antenna location on a second surface of the device in response to the determination that the device is attempting to perform the NFC action. In one aspect, a sensory cue may be a graphical representation on a user interface on the first surface. In such aspect, the sensory cue may include a graphical display such as a "mark" indicating a position on the device user interface to perform the NFC action. Generally, a NFC action may be conducted while the screen is on, whether interacting with a reader/writer such as a point of sale terminal, with a tag such as a smart poster, or with a peer device such as another handheld device. Instead of simply displaying an on-screen message such as "touch the reader", the device may further display a graphical representation which shows where "under" the image a NFC antenna is located. In another aspect, the sensory cue may include at least one of variable vibration indications and/or variable auditory indications. In one aspect, the variable vibration indication may change at least one of a frequency and an intensity of the device vibration based on a distance between the first or second location and a current positioning of the device. In one aspect, the variable auditory indication may change at least one of a frequency and a volume of the device auditory indication based on a distance between the first or second location and a current positioning of the device. Use of the one or more first and second sensory cues may allow for complex antenna designs to be implemented without providing additional burdens to casing manufacturers.

At block 606, the device may determine a type of NFC action that a user is attempting to perform. As used herein, a type of NFC action may include, but is not limited to, a type of RF technology used for an NFC action, a type of remote NFC device with which the communications device is attempting to communicate, a data rate to be used during the NFC action, etc.

At block 608, the device may provide a second sensory cue indicating a second location on the first surface of the device based on one or more factors associated with the determined type of NFC action. In one aspect, the one or more factors may include, but not limited to, comparative sizes of the antenna associated with the remote NFC device and the NFC antenna, a coupling value indicating a strength of magnetic coupling of an antenna associated with the remote NFC device and the NFC antenna, etc. In one aspect, if the device includes multiple antennas, the second sensory cue may be based on a position of the one of the multiple NFC antennas that may be used for the determined type of NFC action. In another aspect, where the device includes combination and/or tunable antennas the second sensory cue may indicate a location based on the determined type of NFC action. For example, a combination focused/wide area antenna may work comparatively better in one location for card emulation, and comparatively better in a different location for reading and writing.

In an optional aspect, at block 610, the user may then align the device with the remote NFC endpoint (e.g., reader/writer, tag, peer device, etc.), based on the one or more second sensory cues, and may perform the NFC action.

FIG. 7 depicts an example flowchart describing another process 700 for efficiently indicating to a user one or more positions to use for performing an NFC action.

At block 702, in an optional aspect, activation of NFC device may be detected. At block 704, the NFC device determines if a NFC action is being attempting and/or may be attempted within a threshold period of time. In one aspect, this detection may result from at least one of activating the device, activating an application associated with NFC, a change in orientation of the device, etc. In another aspect, the device may detect that a remote NFC device is within a threshold distance and may notify the user of its potential presence. If at block 704, the NFC device determines that no NFC action is being attempted and/or may not be attempted within the threshold period of time, then the NFC device may continue to monitor for future NFC actions.

By contrast, if at block 704 the NFC device determines that a NFC action is being attempted, then at block 706, the NFC device may provide a first sensory cue to indicate a first location on the device for antenna alignment for the NFC action. In one aspect, the first sensory cue may provide an indication of a location of a second surface of the NFC device where a NFC antenna is located.

At block 708, the NFC device determines whether a type of attempted NFC action is known. As used herein, a type of NFC action may include, but is not limited to, a type of RF technology used for an NFC action, a type of remote NFC device with which the communications device is attempting to communicate, a data rate to be used during the NFC action, etc. If at block 708, the NFC device determines a type of NFC action that is being attempted, then at block 710 a second sensory cue is provided to indicate a second location to assist with further alignment based on the type of NFC action. At block 712, once the NFC device has been aligned using the second sensory cue, the NFC action may be performed.

By contrast, if at block 708, the NFC device does not determine a type of NFC action that is being attempted, then at block 714 the NFC device may attempt to perform the NFC action based on alignment information provided using the first sensory cue.

Therefore, an NFC device may efficiently indicate to a user one or more positions to use when performing an NFC action.

Figure 8:
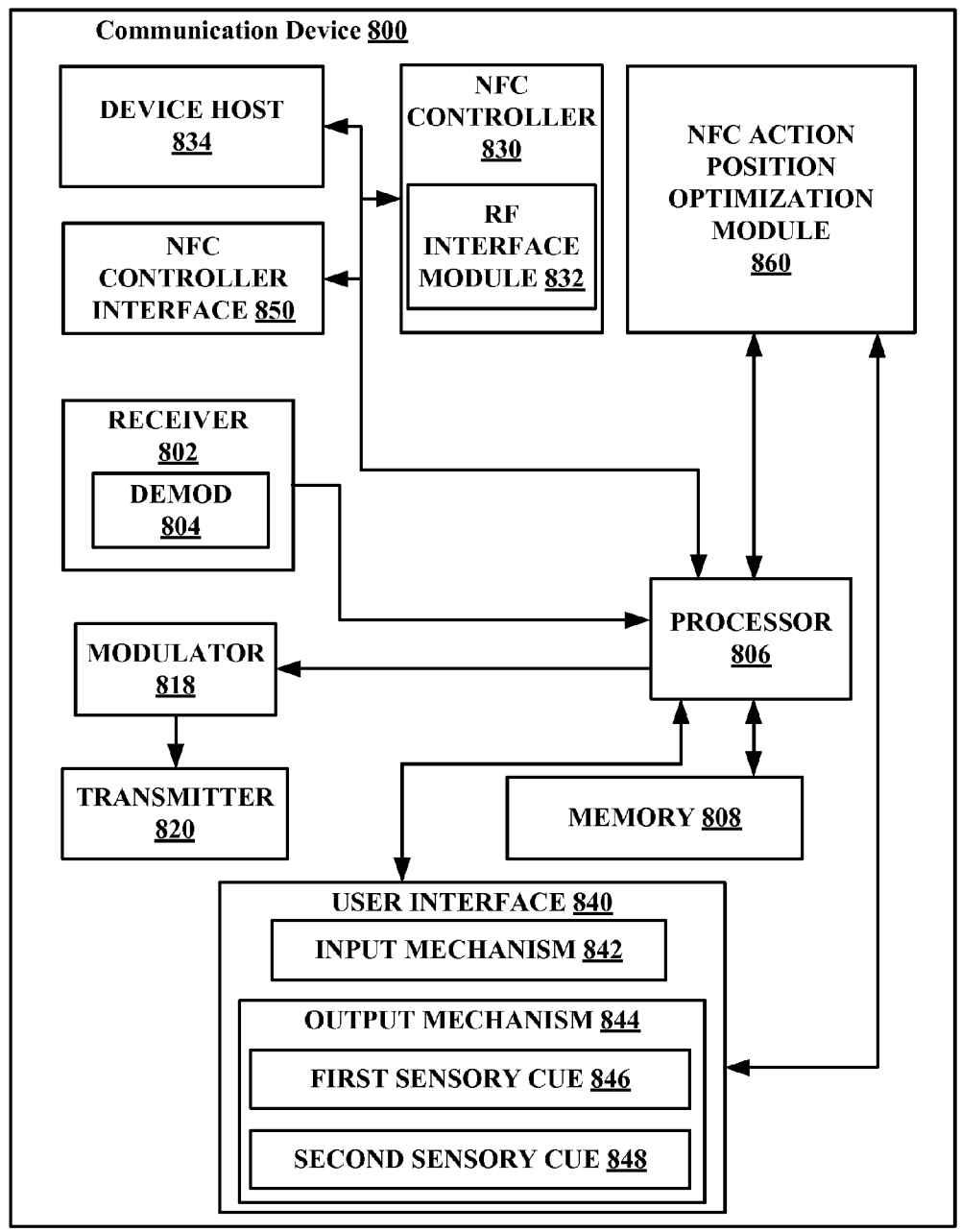
FIG. 8 illustrates a block diagram example architecture of a communications device, according to an aspect.

While referencing FIG. 3, but turning also now to FIG. 8, an example architecture of communications device 800 is illustrated. As depicted in FIG. 8, communications device 800 comprises receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to processor 806 for channel estimation. Processor 806 can be a processor dedicated to analyzing information received by receiver 802 and/or generating information for transmission by transmitter 820, a processor that controls one or more components of device 800, and/or a processor that both analyzes information received by receiver 802, generates information for transmission by transmitter 820, and controls one or more components of communications device 800. Further, signals may be prepared for transmission by transmitter 820 through modulator 818 which may modulate the signals processed by processor 806.

Communications device 800 can additionally comprise memory 808 that is operatively coupled to various components, such as but not limited processor 806 and that can store data to be transmitted, received data, information related to available channels, TCP flows, data associated with analyzed signal and/or interference strength, information related to an assigned channel, power, rate, or the like, and any other suitable information for assisting in NFC action connection establishment.

Further, processor 806, user interface 840, receiver 802, and/or NFC action position optimization module 860 can provide means for detecting that a device is attempting to perform a near field communication (NFC) action to communicate with a remote NFC device, means for providing a first sensory cue to indicate a first location on a first surface of the device corresponding to an antenna location on a second surface of the device in response to the determination that the device is attempting to perform the NFC action, means for determining a type of NFC action the device is attempting to perform, and means for providing a second sensory cue indicating a second location on the first surface of the device based on one or more factors associated with the determined type of NFC action.

It will be appreciated that data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods may comprise, without being limited to, these and any other suitable types of memory.

Device 800 may include a NFC controller (NFCC) 830, device host (DH) 834. In one aspect, NFCC 830 may include RF discovery module 832. RF discovery module 832 may be operable to perform RF discovery using a RF discovery loop as part of a discovery process to enable NFC communications. DH 834 may be operable to generate a command to prompt NFCC 830 to perform various NFC actions, such as but not limited to, RF discovery, NFC data exchange, etc.

In another aspect, communication device 800 may include NCI 850. In one aspect, NCI 850 may be operable to enable communications between a NFC enabled antenna (e.g., 802, 820), NFC controller 830 and DH 834. NCI 850 may be operable to function in a listening mode and/or a polling mode.

Communications device 800 may include user interface 840. User interface 840 may include input mechanisms 842 for generating inputs into communications device 800, and output mechanism 844 for generating information for consumption by the user of the communications device 800. For example, input mechanism 842 may include a mechanism such as a key or keyboard, a mouse, a touch-screen display, a microphone, etc. Further, for example, output mechanism 844 may include a display, an audio speaker, a haptic feedback mechanism, a Personal Area Network (PAN) transceiver etc. In the illustrated aspects, the output mechanism 844 may include a display operable to present media content that is in image or video format or an audio speaker to present media content that is in an audio format.

In another aspect, communications device 800 may include NFC action position optimization module 860. NFC action position optimization module 860 may be operable to prompt to user interface 840 to provide one or more first sensory cues 846 based at least in part on a determination that a NFC action is being attempted by communications device 800. As used herein, a NFC action may include, but is not limited to, RF discovery, NFC link establishment, data exchange, etc. Further, NFC action position optimization module 860 may be operable to prompt to user interface 840 to provide one or more second sensory cues 848 based at least in part on a determination of a type of NFC action that is attempting to be performed by communications device 800. As used herein, a type of NFC action may include, but is not limited to, a type of RF technology used for an NFC action, a type of remote NFC device with which the communications device 800 is attempting to communicate, a data rate to be used during the NFC action, etc. In another aspect, NFC action position optimization module 860 operable to perform processes described with respect to FIGS. 6-7.

Figure 9:
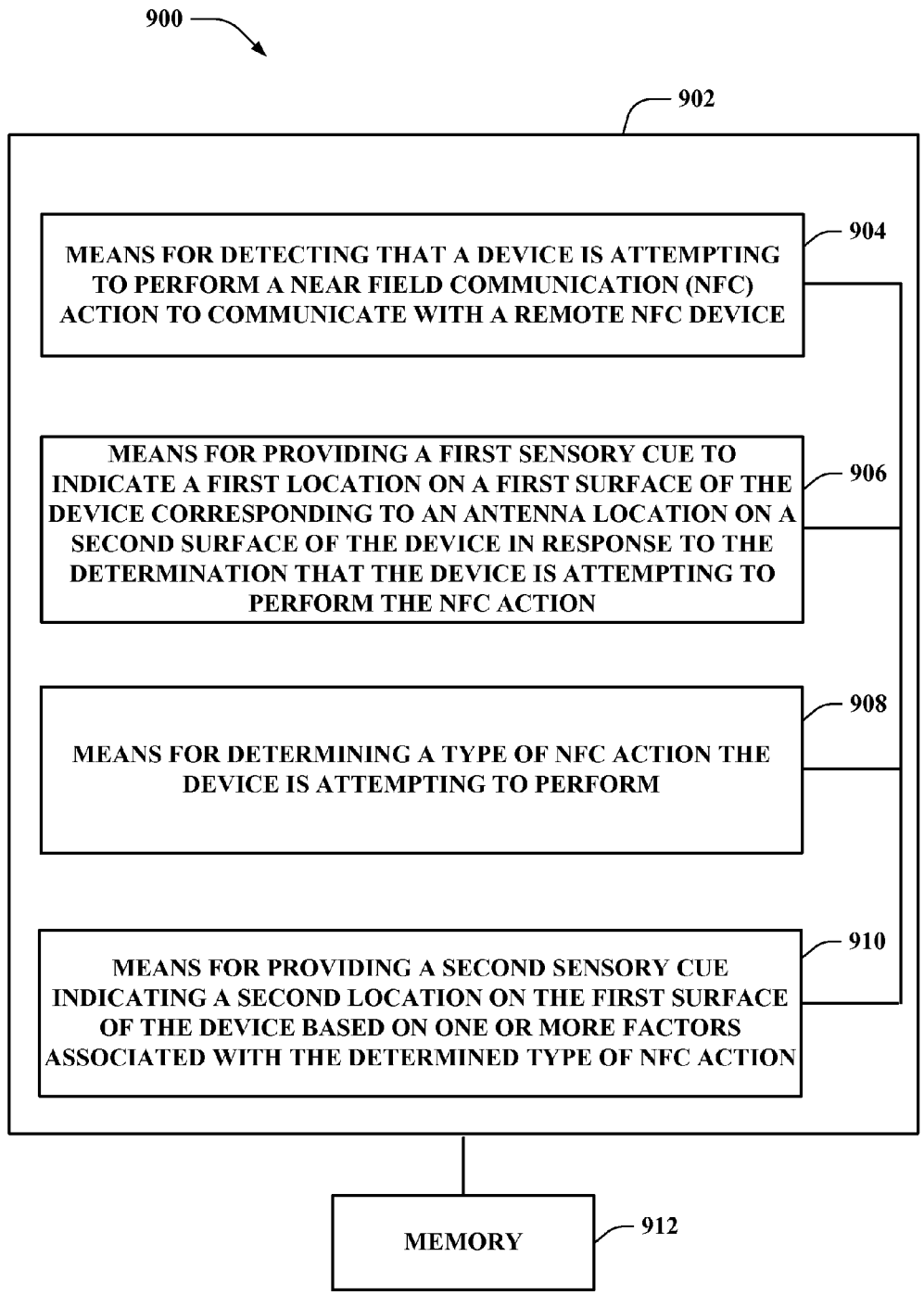
FIG. 9 illustrates a block diagram of an example communication system for improving NFC device positioning for performing a NFC action based on one or more sensory cues, according to an aspect.

FIG. 9 depicts another depicts a block diagram of an exemplary communication system 900 operable to improve NFC device positioning for performing a NFC action based on one or more sensory cues, according to an aspect. For example, system 900 can reside at least partially within a communications device (e.g., communications device 800). It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction.

For instance, logical grouping 902 can include an electrical component that may provide means for detecting that a device is attempting to perform a near field communication (NFC) action to communicate with a remote NFC device 904. In one aspect, the means for detecting may further include means for detecting at least one of activation of the device, initiation of an application, a change in orientation of the device, a user input, etc.

Further, logical grouping 902 can include an electrical component that may provide means for providing a first sensory cue to indicate a first location on a first surface of the device corresponding to an antenna location on a second surface of the device in response to the determination that the device is attempting to perform the NFC action 906.

Still further, logical grouping 902 can include an electrical component that may provide means for determining a type of NFC action the device is attempting to perform 908.

Moreover, logical grouping 902 can include an electrical component that may provide means for providing a second sensory cue indicating a second location on the first surface of the device based on one or more factors associated with the determined type of NFC action 910. In one aspect, the one or more factors may include comparative sizes of an antenna associated with the remote NFC device and the antenna associated with the device, a coupling value indicating a strength of magnetic coupling of an antenna associated with the remote NFC device and at least one of the one or more antennas, etc. In one aspect, at least one of the first sensory cue and the second sensory cue may include a graphical representation on a user interface of the device on the first surface. In another aspect, at least one of the first sensory cue and the second sensory cue may include a variable vibration indication that may change at least one of a frequency and an intensity of the device vibration based on a distance between the first or second location and a current positioning of the device. In one aspect, at least one of the first sensory cue and the second sensory cue may include a variable auditory indication that may change at least one of a frequency, a voice message, and a volume of the device auditory indication based on a distance between the first or second location and a current positioning of the device.

Additionally, system 900 can include a memory 912 that retains instructions for executing functions associated with the electrical components 904, 906, 908, and 910, stores data used or obtained by the electrical components 904, 906, 908, 910, etc. While shown as being external to memory 912, it is to be understood that one or more of the electrical components 904, 906, 908, and 910 may exist within memory 912. In one example, electrical components 904, 906, 908, and 910 can include at least one processor, or each electrical component 904, 906, 908, and 910 can be a corresponding module of at least one processor. Moreover, in an additional or alternative example, electrical components 904, 906, 908, and 910 may be a computer program product including a computer readable medium, where each electrical component 904, 906, 908, and 910 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC, -f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
    detecting that a device is attempting to perform a near field communication (NFC) action to communicate with a remote NFC device;
    providing a first sensory cue to indicate a first location on a first surface of the device corresponding to an antenna location on a second surface of the device in response to the determination that the device is attempting to perform the NFC action;
    determining a type of NFC action the device is attempting to perform; and
    providing a second sensory cue indicating a second location on the first surface of the device based on one or more factors associated with the determined type of NFC action.

2. The method of claim 1, wherein the one or more factors includes comparative sizes of an antenna associated with the remote NFC device and the antenna associated with the device.

3. The method of claim 1, wherein the one or more factors includes a coupling value indicating a strength of magnetic coupling of an antenna associated with the remote NFC device and the antenna location.

4. The method of claim 1, wherein at least one of the first sensory cue and the second sensory cue comprises a graphical representation on a user interface of the device on the first surface.

5. The method of claim 4, wherein the graphical representation comprises at least one of a target shape, text indicating a location, and text indicating one or more directions for a user to follow.

6. The method of claim 1, wherein at least one of the first sensory cue and the second sensory cue comprises a variable vibration indication, wherein the variable vibration indication changes at least one of a frequency and an intensity of the device vibration based on a distance between the first or second location and a current positioning of the device.

7. The method of claim 1, wherein at least one of the first sensory cue and the second sensory cue comprises a variable auditory indication, wherein the variable auditory indication changes at least one of a frequency, a voice message, and a volume of the device auditory indication based on a distance between the first or second location and a current positioning of the device.

8. The method of claim 1, wherein the detecting further comprises detecting at least one of:
    activation of the device;
    initiation of an application;
    a change in orientation of the device; and
    a user input.

9. A (non-transitory) computer program product, comprising:
    a computer-readable medium comprising code for:
    detecting that a device is attempting to perform a near field communication (NFC) action to communicate with a remote NFC device;
    providing a first sensory cue to indicate a first location on a first surface of the device corresponding to an antenna location on a second surface of the device in response to the determination that the device is attempting to perform the NFC action;
    determining a type of NFC action the device is attempting to perform; and
    providing a second sensory cue indicating a second location on the first surface of the device based on one or more factors associated with the determined type of NFC action.

10. The (non-transitory) computer program product of claim 9, wherein the one or more factors includes comparative sizes of an antenna associated with the remote NFC device and the antenna associated with the device.

11. The (non-transitory) computer program product of claim 9, wherein the one or more factors includes a coupling value indicating a strength of magnetic coupling of an antenna associated with the remote NFC device and the antenna location.

12. The (non-transitory) computer program product of claim 9, wherein at least one of the first sensory cue and the second sensory cue comprises a graphical representation on a user interface of the device on the first surface.

13. The (non-transitory) computer program product of claim 12, wherein the graphical representation comprises at least one of a target shape, text indicating a location, and text indicating one or more directions for a user to follow.

14. The (non-transitory) computer program product of claim 9, wherein at least one of the first sensory cue and the second sensory cue comprises a variable vibration indication, wherein the variable vibration indication changes at least one of a frequency and an intensity of the device vibration based on a distance between the first or second location and a current positioning of the device.

15. The (non-transitory) computer program product of claim 9, wherein at least one of the first sensory cue and the second sensory cue comprises a variable auditory indication, wherein the variable auditory indication changes at least one of a frequency, a voice message, and a volume of the device auditory indication based on a distance between the first or second location and a current positioning of the device.

16. The (non-transitory) computer program product of claim 9, wherein the code for detecting further comprises code for detecting at least one of:
    activation of the device;
    initiation of an application;
    a change in orientation of the device; and
    a user input.

17. An apparatus, comprising:
    means for detecting that a device is attempting to perform a near field communication (NFC) action to communicate with a remote NFC device;
    means for providing a first sensory cue to indicate a first location on a first surface of the device corresponding to an antenna location on a second surface of the device in response to the determination that the device is attempting to perform the NFC action;
    means for determining a type of NFC action the device is attempting to perform; and
    means for providing a second sensory cue indicating a second location on the first surface of the device based on one or more factors associated with the determined type of NFC action.

18. The apparatus of claim 17, wherein the one or more factors includes comparative sizes of an antenna associated with the remote NFC device and the antenna associated with the device.

19. The apparatus of claim 17, wherein the one or more factors includes a coupling value indicating a strength of magnetic coupling of an antenna associated with the remote NFC device and the antenna location.

20. The apparatus of claim 17, wherein at least one of the first sensory cue and the second sensory cue comprises a graphical representation on a user interface of the device on the first surface.

21. The apparatus of claim 20, wherein the graphical representation comprises at least one of a target shape, text indicating a location, and text indicating one or more directions for a user to follow.

22. The apparatus of claim 17, wherein at least one of the first sensory cue and the second sensory cue comprises a variable vibration indication, wherein the variable vibration indication changes at least one of a frequency and an intensity of the device vibration based on a distance between the first or second location and a current positioning of the device.

23. The apparatus of claim 17, wherein at least one of the first sensory cue and the second sensory cue comprises a variable auditory indication, wherein the variable auditory indication changes at least one of a frequency, a voice message, and a volume of the device auditory indication based on a distance between the first or second location and a current positioning of the device.

24. The apparatus of claim 17, wherein the first surface is substantially parallel to the second surface and the first and second surfaces are on opposite sides of the device, and wherein the first surface further includes a user interface and wherein at least one of the first and second sensory cues further include one or more graphical representations displayed on the user interface.

25. The apparatus of claim 17, wherein the second surface is not visually accessible to a user when the device is positioned to perform the NFC action.

26. The apparatus of claim 17, wherein the means for detecting further comprises means for detecting at least one of:
activation of the device;
initiation of an application;
a change in orientation of the device; and
a user input.

27. An apparatus for NFC communications, comprising:
a user interface on a first surface of the apparatus;
an antenna accessible from a second surface of the apparatus' a memory;
a processor coupled to the memory; and
a NFC action position optimization module coupled to at least one of the memory, the user interface or the processor and configured to:
detect that the apparatus is attempting to perform a near field communication (NFC) action to communicate with a remote NFC device;
provide a first sensory cue to indicate a first location on the first surface of the apparatus corresponding to the antenna location on the second surface of the apparatus in response to the determination that the apparatus is attempting to perform the NFC action;
determine a type of NFC action the apparatus is attempting to perform; and
provide a second sensory cue indicating a second location on the first surface of the apparatus based on one or more factors associated with the determined type of NFC action.

28. The apparatus of claim 27, wherein the one or more factors includes comparative sizes of an antenna associated with the remote NFC device and the antenna associated with the apparatus.

29. The apparatus of claim 27, wherein the one or more factors includes a coupling value indicating a strength of magnetic coupling of an antenna associated with the remote NFC device and the antenna location.

30. The apparatus of claim 27, wherein at least one of the first sensory cue and the second sensory cue comprises a graphical representation on the user interface of the apparatus on the first surface.

31. The apparatus of claim 30, wherein the graphical representation comprises at least one of a target shape, text indicating a location, and text indicating one or more directions for a user to follow.

32. The apparatus of claim 27, wherein at least one of the first sensory cue and the second sensory cue comprises a variable vibration indication, wherein the variable vibration indication changes at least one of a frequency and an intensity of the apparatus vibration based on a distance between the first or second location and a current positioning of the apparatus.

33. The apparatus of claim 27, wherein at least one of the first sensory cue and the second sensory cue comprises a variable auditory indication, wherein the variable auditory indication changes at least one of a frequency, a voice message, and a volume of the apparatus auditory indication based on a distance between the first or second location and a current positioning of the apparatus.

34. The apparatus of claim 27, wherein the first surface is substantially parallel to the second surface and the first and second surfaces are on opposite sides of the apparatus, and wherein at least one of the first and second sensory cues further include one or more graphical representations displayed on the user interface.

35. The apparatus of claim 27, wherein the second surface is not visually accessible to a user when the apparatus is positioned to perform the NFC action.

36. The apparatus of claim 27, wherein the detecting further comprises detecting at least one of:
activation of the apparatus;
initiation of an application;
a change in orientation of the apparatus; and
a user input.

* * * * *